United States Patent Office 3,092,543
Patented June 4, 1963

3,092,543
(O,O-DIMETHYLPHOSPHORODITHIO) ALLYL PHTHALATE PESTICIDAL COMPOSITIONS
Sidney B. Richter, Chicago, Ill., assignor to Velsicol Chemical Corporation, Chicago, Ill., a corporation of Illinois
No Drawing. Filed May 9, 1961, Ser. No. 108,726
12 Claims. (Cl. 167—30)

This invention relates to new chemical compositions of matter. More specifically, this invention relates to new chemical compounds of the formula:

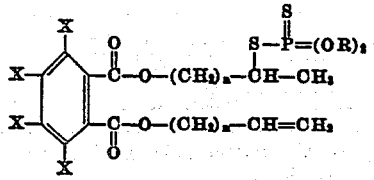

wherein each X is independently selected from the group consisting of hydrogen, chlorine, and bromine atoms and unsubstituted lower alkyl and unsubstituted lower alkoxy radicals, R is an unsubstituted alkyl radical containing from 1 to 3 carbon atoms, and $n$ is a whole number from 0 to 1. These new compounds, useful as pesticides, particularly as insecticides and miticides, are the 1:1 addition products of the dialkyl phosphorodithioates $$HSP(S)(OR)_2$$

where R is as defined above, with a suitable divinyl or diallyl phthalate.

The suitable divinyl or diallyl phthalate reactants include divinyl phthalate and diallyl phthalate, which are preferred reactants due to their greater availability, as well as the divinyl and diallyl esters of halo-, lower-alkyl-, or lower-alkoxy-substituted phthalic acid. Examples of the halo-, lower-alkyl-, or lower-alkoxy-substituted phthalic acids which can be esterified to divinyl or diallyl phthalate reactants of this invention by the common esterification techniques, for example, the vinyl interchange method or direct esterification with allyl alcohol, are: 3 - chlorophthalic acid, 4 - chlorophthalic acid, 3-bromophthalic acid, 4-bromophthalic acid, 3-methyl-phthalic acid, 4-methylphthalic acid, 3-ethylphthalic acid, 4-ethylphthalic acid, 4-methoxyphthalic acid, 3,4-dichloro-phthalic acid, 3,5 - dichlorophthalic acid, 3,6 - dichloro-phthalic acid, 4,5-dichlorophthalic acid, 3,4-dibromo-phthalic acid, 4,5 - dibromophthalic acid, 3,6 - dibromo-phthalic acid, 3,4-dimethylphthalic acid, 3,5-dimethyl-phthalic acid, 4,5-dimethylphthalic acid, 3,6-dimethyl-phthalic acid, 3,4-dimethoxyphthalic acid, 3,6-dimethoxy-phthalic acid, 3,4,5-trimethoxyphthalic acid, 3,4,5,6-tetra-chlorophthalic acid, 3-methyl - 5 - methoxyphthalic acid, and the like.

The new compounds of this invention can be prepared readily by the addition of an approximately molecular proportion of the dialkyl phosphorodithioate to each molecular proportion of the divinyl or diallyl phthalate employed. While these are satisfactory proportions of reactants, it is preferred to use a slight excess of the dialkyl phosphorodithioate. The reaction can be carried out satisfactorily in the absence of a solvent, but inert solvents or diluents such as benzene, toluene, or xylene can be used if desired. It is also desirable to add a small amount of an oxidation inhibitor, such as hydroquinone, to the reaction mixture. The reaction temperature is not critical, but reaction temperatures in the range from about normal room temperature to about 100° C. are operable. A preferred reaction temperature is the reflux temperature of a solution of the reaction mixture in a solvent or diluent, if one is used. While the exact reaction time is dependent on a variety of factors, the addition reactions are generally complete within 30 hours. When the reaction is completed, the reaction mixture is cooled and taken up in a suitable solvent, if one has not already been used in the reaction. The solution is then washed, first with a dilute aqueous solution of a base such as sodium carbonate to remove any excess acid reactant, and then with water. The solution is dried over an anhydrous drying agent such as sodium sulfate, and filtered. The solvent is then distilled off in vacuo to leave a residue to the desired addition product, which is often sufficiently pure for use without further purification. If desired, however, it can be purified by fractional distillation or other techniques known to those skilled in the art.

Compounds of this invention as represented by the structural formula in which $n$ is 0 are obtained by using the appropriate divinyl phthalate as the reactant with the dialkyl phosphorodithioate, while compounds in which $n$ is 1 are obtained by using an appropriate diallyl phthalate.

The manner in which the new compounds of this invention can be prepared is illustrated in the following examples. It is understood that although a specific divinyl or diallyl phthalate reactant is specified in the examples for the purpose of illustration, other divinyl and diallyl phthalates within the scope of this invention may be substituted therefor.

EXAMPLE 1

*Preparation of 2-(O,O-Dimethylphosphorodithio) Propyl Allyl Phthalate*

Diallyl phthalate (49.2 g.; 0.2 mol) and hydroquinone (0.1 g.) were placed into a 250 ml. round-bottom flask fitted with a reflux condenser, mechanical stirrer, and internal thermometer, O,O-dimethylphosphorodithioate (80 g.; 0.5 mol) was added portionwise with stirring. Thereafter the solution was heated and maintained at 65° C. for approximately 22 hours. The solution was cooled to room temperature, diluted with benzene, washed first with 10% aqueous sodium carbonate solution, then with water, dried over anhydrous sodium sulfate, and filtered. The benzene was distilled off in vacuo, and the residue distilled to remove any unreacted diallyl phthalate as the fraction boiling 157°–165° C. at 4 mm. mercury. The residue therefrom was distilled in a falling film column to yield 2 - (O,O-dimethylphosphorodithio)-propyl allyl phthalate as a yellow liquid fraction at 120° C. and 0.1 mm. mercury and having an index of refraction (D line) at 26° C. of 1.5480 and the following elemental analysis as calculated for $C_{16}H_{21}PS_2O_6$:

|  | C | H | S | P |
|---|---|---|---|---|
| Theoretical, percent | 47.54 | 5.19 | 15.85 | 7.67 |
| Found, percent | 47.86 | 5.16 | 15.37 | 7.40 |

EXAMPLE 2

*Preparation of 1-(O,O-Dimethylphosphorodithio) Ethyl Vinyl Phthalate*

Divinyl phthalate (45.6 g.; 0.2 mol) and hydroquinone (1 g.) are placed into a 250 ml. round-bottom flask fitted with a reflux condenser, mechanical stirrer, and internal thermometer. O,O-dimethyl phosphorodithioate (48 g.; 0.3 mol) is added portionwise with stirring. Thereafter, the solution is heated and maintained at 70° C. for about 15 hours. Upon cooling, the solution is diluted with benzene, washed with 10% aqueous sodium carbonate solution, washed with water, dried over anhydrous sodium sulfate, and filtered. The benzene is removed in vacuo, and the residue distilled in vacuo to recover any unreacted divinyl phthalate. Further distillation in vacuo of the residue yields 1-(O,O-dimethylphosphorodithio)ethyl vinyl phthalate.

EXAMPLE 3

*Preparation of 2-(O,O-Dimethylphosphorodithio)-Propyl Allyl 3-Chlorophthalate*

Diallyl 3-chlorophthalate (56.3 g.; 0.2 mol) and hydroquinone (1 g.) are mixed and O,O-dimethyl phosphorodithioate (48 g.; 0.3 mol) is slowly added with stirring. The solution is heated at 70° C. for about 18 hours. Upon cooling the solution is diluted with benzene, washed with 10% aqueous sodium carbonate solution, washed with water, dried over anhydrous sodium sulfate, and filtered. The benzene is removed in vacuo, and the residue distilled in vacuo to yield 2-(O,O-dimethylphosphorodithio)propyl allyl 3-chlorophthalate.

Other useful compounds within the scope of this invention can be prepared in the manner detailed in the previous examples. Given in the following examples are the reactants required to prepare the indicated named compounds of this invention:

EXAMPLE 4

Diallyl phthalate+O,O-diethyl phosphorodithioate=2-(O,O-diethylphosphorodithio)propyl allyl phthalate.

EXAMPLE 5

Diallyl phthalate+O,O-di-n-propyl phosphorodithioate=2 - (O,O - di - n - propylphosphorodithio)propyl allyl phthalate.

EXAMPLE 6

Divinyl phthalate+O,O - diethyl phosphorodithioate=1-(O,O-diethylphosphorodithio)ethyl vinyl phthalate.

EXAMPLE 7

Divinyl phthalate+O,O-di-n-propyl phosphorodithioate=1-(O,O - di - n - propylphosphorodithio)ethyl vinyl phthalate.

EXAMPLE 8

Diallyl 4-chlorophthalate+O,O-dimethyl phosphorodithioate=2-(O,O-dimethylphosphorodithio)propyl allyl 4-chlorophthalate.

EXAMPLE 9

Diallyl 4,5-dichlorophthalate+O,O-dimethyl phosphorodithioate=2 - (O,O - dimethylphosphorodithio)propyl allyl 4,5-dichlorophthalate.

EXAMPLE 10

Divinyl 3-bromophthalate+O,O-diethyl phosphorodithioate=1-(O,O-diethylphosphorodithio)ethyl vinyl 3-bromophthalate.

EXAMPLE 11

Diallyl 3-methylphthalate+O,O-dimethylphosphorodithioate=2 - (O,O - dimethylphosphorodithio)propyl allyl 3-methylphthalate.

EXAMPLE 12

Divinyl 3,4 - dimethylphthalate+O,O - dimethyl phosphorodithioate=1 - (O,O - dimethylphosphorodithio) ethyl vinyl 3,4-dimethylphthalate.

EXAMPLE 13

Diallyl 3,4,5-trimethoxyphthalate+O,O-dimethyl phosphorodithioate=2 - (O,O - dimethylphosphorodithio)-propyl allyl 3,4,5-trimethoxyphthalate.

EXAMPLE 14

Diallyl 3,4,5,6 - tetrachlorophthalate+O,O - dimethyl phosphorodithioate=2 - (O,O-dimethylphosphorodithio)-propyl allyl 3,4,5,6-tetrachlorophthalate.

The utility of the compounds of this invention was illustrated, for example, by experiments carried out for the control of insects by feeding. The test compounds were formulated as 10% wettable powder concentrates by adding to an inert carrier and grinding to a uniform blend on a ball mill. The respective formulations were diluted with water to the desired concentrations of actual chemical. Cranberry bean plants were dipped in appropriate concentrations of the various formulations and allowed to dry. Third instar stage larvae of the insects were then caged on the treated plants and maintained under greenhouse conditions for 48 hours, after which time observations of mortality were made. Three replicates were used for each level of application. In these experiments, the product of Example 1 gave the following results:

| Concn., Percent Actual Chem. | Insect | Percent Mortality |
|---|---|---|
| 0.4 | Southern Army Worm | 100.0 |
| 0.1 | Mexican Bean Beetle | 100.0 |
| 0.05 | Southern Army Worm | 93.3 |
| 0.0 (Control) | do | 0.0 |
| 0.0 (Control) | Mexican Bean Beetle | 0.0 |

The utility of the compounds of this invention was further illustrated by experiments carried out for the systemic control of two spotted spider mites by root absorption and translocation. The test compounds were dissolved in acetone and dispersed in distilled water at the desired concentrations of actual chemical. Host plants, infested with mixed life stages of the mites, were uprooted, washed free of soil, and placed in glass jars containing 100 p.p.m. of the dispersed test compound. Aluminum foil was placed around the plant stem and jar to reduce possible escape of toxic vapors from the test dispersion. The test plants were maintained in this manner in the greenhouse for seven days and then observed for systemic miticidal effectiveness. Three replicates were used for each treatment. In these experiments, the product of Example 1 gave the following results:

| Concn., p.p.m. | Organism | Percent Mortality |
|---|---|---|
| 100 | Two Spotted Spider Mites | 92.3 |
| 0.0 (Control) | do | 0.0 |

Pesticidal compositions of this invention are prepared by mixing one or more of the new compounds of this invention with inert carriers to provide formulations adapted for ready and efficient application with conventional applicator equipment to the site of the pest infestation. For example, pesticidal compositions or formulations according to this invention are prepared in the form of solids or liquids. Solid compositions are preferably in the form of dusts. These are prepared to give homogeneous, free-flowing dusts by admixing the active compound or compounds of this invention with finely divided solids such as the talcs, natural clays, pyrophyllite, diatomaceous earth, fuller's earth, or flours such as walnut shell or wheat flours. Other inert solid carriers of the type ordinarily used in preparing pest control compositions in dusts or powdered form can also be used.

Liquid compositions according to this invention are prepared by admixing one or more of the new compounds of this invention with a suitable inert liquid diluent. In some cases the compounds are sufficiently soluble in the common pesticide solvents such as kerosene, xylene, fuel oil, the alkylated naphthalenes, and the like so that they can be used directly as solutions in these substances. However, the pesticidal compositions of this invention can also contain a surface-active agent of the kind used in the art to enable the active compounds to be readily dispersed in water or other liquids to give sprays, which are a preferred method of applying the active compounds of this invention. Other pesticides as well as such substances as fertilizers, activators, adhesives, spreaders, and synergists can be added to these formulations if desired.

The active compounds of this invention are applied in amounts sufficient to exert the desired pesticidal action. The amount of the active compound present in the pesticidal compositions as actually applied for preventing or controlling pest infestations varies with the type of application, the particular species which are to be controlled, the purpose for which the treatment is made, and the like. Generally, the solid or liquid compositions of this invention will contain up to about 90% of the active compounds.

I claim:

1. A compound of the formula

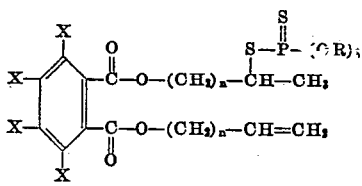

wherein each X is independently selected from the group consisting of hydrogen, chlorine and bromine atoms and unsubstituted lower alkyl and unsubstituted lower alkoxy radicals, R is an unsubstituted alkyl radical containing from 1 to 3 carbon atoms, and $n$ is a whole number from 0 to 1.

2. 2 - (O,O - dimethylphosphorodithio)propyl allyl phthalate.

3. 2-(O,O-diethylphosphorodithio)propyl allyl phthalate.

4. 2 - (O,O - dipropylphosphorodithio)propyl allyl phthalate.

5. 1-(O,O-dimethylphosphorodithio)ethyl vinyl phthalate.

6. 1-(O,O-diethylphosphorodithio)ethyl vinyl phthalate.

7. 1-(O,O-dipropylphosphorodithio)ethyl vinyl phthalate.

8. 2 - (O,O - dimethylphosphorodithio)propyl allyl 3-chlorophthalate.

9. 2 - (O,O - dimethylphosphorodithio)propyl allyl 4-chlorophthalate.

10. 2-(O,O-dimethylphosphorodithio)propyl allyl 4,5-dichlorophthalate.

11. An insecticidal and miticidal composition comprising an inert carrier and a toxic amount of a compound of claim 1.

12. A method of destroying undesirable insects and mites which comprises contacting these pests with an insecticidal and miticidal composition comprising an inert carrier and as the essential active ingredient, in a quantity which is toxic to said pests, a compound of claim 1.

References Cited in the file of this patent

UNITED STATES PATENTS

| | | |
|---|---|---|
| 2,578,652 | Cassady | Dec. 18, 1951 |
| 2,799,696 | Tolkmith et al. | July 16, 1957 |
| 2,844,619 | Escobar | July 22, 1958 |
| 2,892,751 | Saul | June 30, 1959 |
| 2,894,974 | Lanham | July 14, 1959 |
| 2,928,864 | Tabor | Mar. 15, 1960 |
| 2,980,723 | Frank et al. | Apr. 18, 1961 |